US012425446B2

(12) United States Patent
Angelo et al.

(10) Patent No.: US 12,425,446 B2
(45) Date of Patent: Sep. 23, 2025

(54) PREVENTION OF VISHING ATTACKS (71) Applicant: MICRO FOCUS LLC, Santa Clara, CA (US)

(72) Inventors: Michael F. Angelo, Houston, TX (US); Douglas Max Grover, Rigby, ID (US)

(73) Assignee: Micro Focus LLC, Santa Clara, CA (US)

( * ) Notice: Subject to any disclaimer, the term of this patent is extended or adjusted under 35 U.S.C. 154(b) by 191 days.

(21) Appl. No.: 18/149,618

(22) Filed: Jan. 3, 2023

(65) Prior Publication Data
US 2024/0223604 A1    Jul. 4, 2024

(51) Int. Cl.
*H04L 9/40* (2022.01)
*H04L 65/1069* (2022.01)
*H04L 65/403* (2022.01)

(52) U.S. Cl.
CPC ...... *H04L 63/1466* (2013.01); *H04L 63/1483* (2013.01); *H04L 65/1069* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 6,996,717 B2 * | 2/2006 | Yin | ...................... | H04N 19/467 713/168 |
| 8,838,978 B2 * | 9/2014 | Winograd | ............... | H04L 9/321 713/176 |
| 8,848,969 B2 * | 9/2014 | Ramsdell | ......... | H04N 21/26258 382/100 |
| 9,246,926 B2 * | 1/2016 | Erlingsson | .............. | G06F 21/10 |
| 9,300,910 B2 * | 3/2016 | Shoemake | .......... | H04M 3/5315 |
| 9,516,359 B2 * | 12/2016 | Srinivasan | ....... | H04N 21/23476 |
| 9,848,003 B2 * | 12/2017 | Stevens | .................... | H04L 63/14 |
| 10,523,706 B1 * | 12/2019 | Richards | ............. | H04L 63/1483 |
| 10,811,018 B2 * | 10/2020 | Magdina | ............. | H04L 63/1475 |
| 10,887,362 B2 * | 1/2021 | Vikramaratne | ....... | H04L 65/762 |
| 11,368,766 B2 * | 6/2022 | Zhao | .................. | H04N 21/2389 |
| 11,373,663 B2 * | 6/2022 | Huber | ..................... | G10L 17/02 |
| 11,689,660 B2 * | 6/2023 | Adolphe | ............ | H04W 12/088 455/411 |
| 11,734,515 B2 * | 8/2023 | Millius | ................. | H04M 3/527 704/9 |

(Continued)

FOREIGN PATENT DOCUMENTS

WO    WO 1999/017536    *    4/1999    ............... H04N 1/32

*Primary Examiner* — Backhean Tiv
(74) *Attorney, Agent, or Firm* — Sheridan Ross P.C.

(57) ABSTRACT

A communication stream is received. For example, the communication stream may be a part of a communication session, such as, a voicemail, a videomail, a voice conference call, a video conference call, and/or the like. A determination is made if the communication stream is completely generated using a session watermark. The session watermark is associated with the communication session. In response to determining that the communication stream is completely generated using the session watermark, the communication stream is identified as a legitimate communication stream. In response to determining that the communication stream has not been completely generated using the session watermark, the communication stream is identified as potentially a vishing communication steam.

20 Claims, 7 Drawing Sheets

(56) References Cited

U.S. PATENT DOCUMENTS

| | | | |
|---|---|---|---|
| 2001/0037465 A1* | 11/2001 | Hart, III | H04N 21/8358 726/28 |
| 2005/0193205 A1* | 9/2005 | Jacobs | H04L 63/126 713/176 |
| 2009/0083541 A1* | 3/2009 | Levine | G06Q 30/0603 713/172 |
| 2014/0168344 A1* | 6/2014 | Shoemake | H04N 7/147 348/14.01 |
| 2014/0325550 A1* | 10/2014 | Winograd | H04N 21/8456 725/19 |
| 2015/0373032 A1* | 12/2015 | Stevens | H04M 3/4365 713/176 |
| 2019/0013033 A1* | 1/2019 | Bhimanaik | G10L 19/018 |
| 2019/0335213 A1* | 10/2019 | Bieber | H04N 21/26606 |
| 2020/0287935 A1* | 9/2020 | Richards | H04L 63/168 |
| 2020/0296071 A1* | 9/2020 | Li | G06T 1/0028 |
| 2021/0056191 A1* | 2/2021 | Emerson | G06F 21/57 |
| 2021/0067842 A1* | 3/2021 | Revital | G06F 21/1063 |
| 2021/0168238 A1* | 6/2021 | Adolphe | H04W 12/069 |
| 2024/0022769 A1* | 1/2024 | Singh | H04N 21/43072 |
| 2024/0080314 A1* | 3/2024 | Tseng | H04L 63/0245 |
| 2024/0223604 A1* | 7/2024 | Angelo | H04L 63/1466 |
| 2024/0282314 A1* | 8/2024 | Griffin | H04L 12/1822 |

\* cited by examiner

PREVENTION OF VISHING ATTACKS

FIELD

The disclosure relates generally to vishing attacks and particularly to methods and systems for detecting and preventing vishing attacks.

BACKGROUND

Today, attacks to get information from different organizations are on the increase. There has been a dramatic increase in deep fakes, including vishing attacks. Nefarious actors can take different samples of a user's voice/image to create a fake voicemail, fake videomail or even a fake voice/video conference stream that can seem as if it is actually from an authorized person. Instead of being legitimate, the fake voicemail/videomail/video conference stream can convince or instruct a person to do something that they may not normally do. This action can result in the loss of information, monies, trade secrets, passwords, compromise of an entire infrastructure, etc. While phishing today results in the loss of billions of dollars annually, this method of attack can be far more damaging.

SUMMARY

These and other needs are addressed by the various embodiments and configurations of the present disclosure. The present disclosure can provide a number of advantages depending on the particular configuration. These and other advantages will be apparent from the disclosure contained herein.

A communication stream is received. For example, the communication stream may be a part of a communication session, such as, a voicemail, a videomail, a voice conference call, a video conference call, and/or the like. A determination is made if the communication stream is completely generated using a session watermark. The session watermark is associated with the communication session. In response to determining that the communication stream is completely generated using the session watermark, the communication stream is identified as a legitimate communication stream. In response to determining that the communication stream has not been completely generated using the session watermark, the communication stream is identified as potentially a vishing communication steam.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As discussed herein, a "communication stream" is a video and/or video stream that is part of a real-time communication session. A real-time communication session typically comprises a communication session between a plurality of users/user communication devices but may also include a user leaving a voice/video mail message for another user. For example, the communication session may be a voice communication session, a video communication session, a left voicemail, a left videomail, a conference call (a conferenced communication session), and/or the like.

As discussed herein, the term "vishing" is defined as the fraudulent practice of making voice/video calls or leaving a voice/video messages purporting to be from a legitimate source. A vishing attack may induce an individual or person to reveal critical information/make critical transactions, such as, revealing bank numbers, revealing credit card numbers, making improper transactions, revealing trade secrets, and/or the like.

As discussed herein, a "session watermark" is a watermark that is used to watermark a video/video stream of a communication session. For example, a session watermark may be used to watermark a voice call, a video call, a voicemail, a videomail, a conference call, and/or the like. Typically the session watermark is unique for each communication session. By making the session watermark unique, a hacker is unable to splice conversations/videos together.

As discussed herein, a "mixer watermark" is a watermark used by a mixer to generate a watermarked video and/or video stream/composite stream. For example, in a conference call between three users (A, B, and C), the watermarked composite stream is sent to the user A from the mixer will be a watermarked composite stream of the users B and C.

As discussed herein a "file watermark" is a watermark that is associated with a recorded voice/video file.

As discussed herein, a "conference call" may include any call that comprises two or more users. The conference call may be any type of conference call, such as a voice conference call, a video conference call, and/or the like.

As discussed herein, the term "voice" may include any type of audible information, such as music, sounds, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
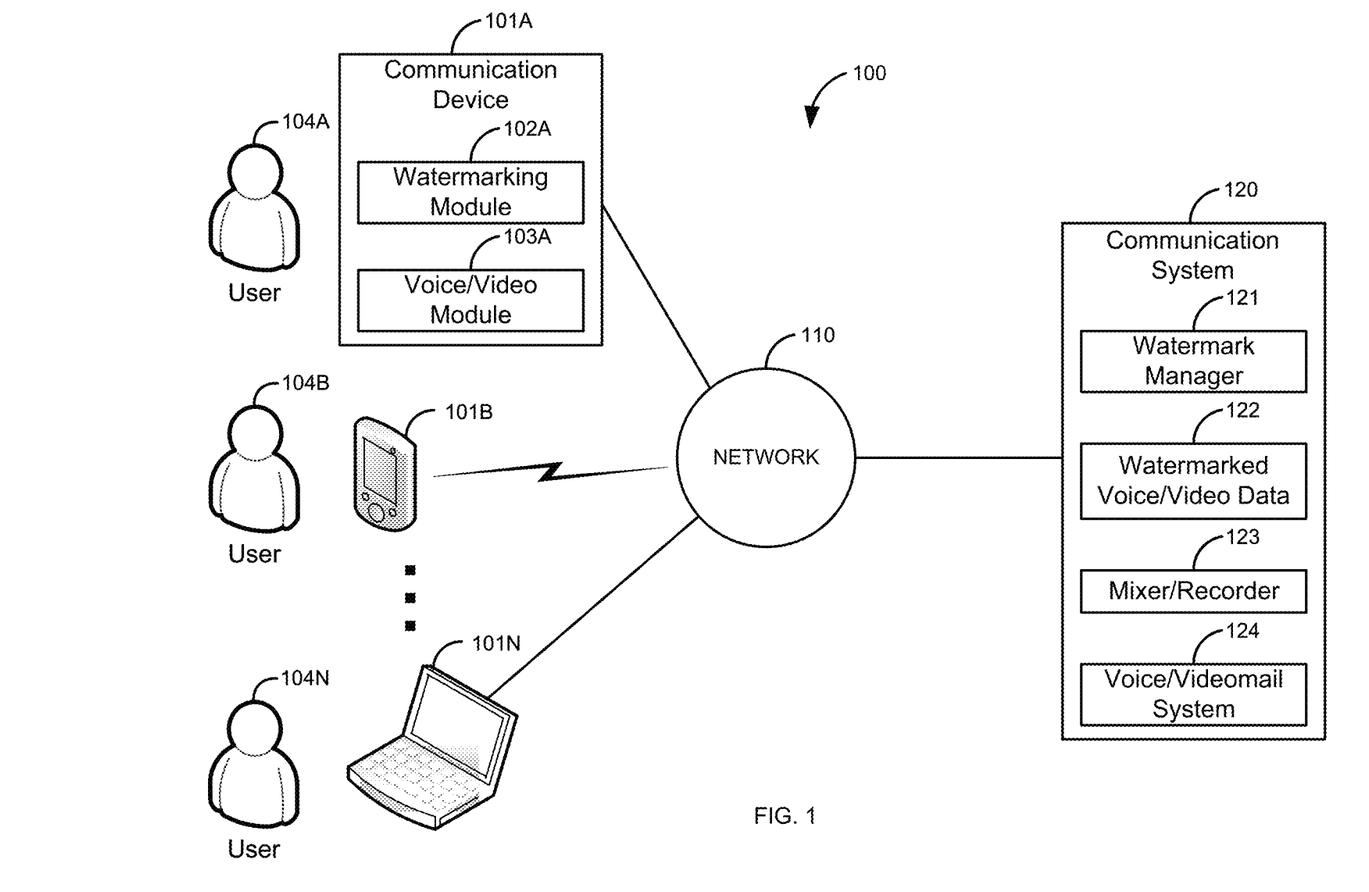
FIG. 1 is a block diagram of a first illustrative system for prevention of vishing attacks.

FIG. 1 is a block diagram of a first illustrative system 100 for prevention of vishing attacks. The first illustrative system 100 comprises communication devices 101A-101N, a network 110, and a communication system 120. In addition, users 104A-104N are shown for convenience.

The communication devices 101A-101N can be or may include any user device that can communicate on the network 110, such as a Personal Computer (PC), a telephone, a video system, an audio system, a cellular telephone, a Personal Digital Assistant (PDA), a tablet device, a notebook device, a smartphone, a laptop computer, and/or the like. As shown in FIG. 1, any number of communication devices 101A-101N may be connected to the network 110, including only a single communication device 101.

The communication devices 101A further comprises a watermarking module 102A and a voice/video module 103A. The watermarking module 102A is used to watermark voice and/or video data in a communication stream/communication session. The watermarking module 102A can also be used to exchange watermarks. For example, the watermarking module 102A may exchange a session watermark and a mixer watermark with the watermark manager 121 for a voice conference call.

The voice/video module 103A may be any hardware coupled with software that can be used to establish a voice and/or video communication session between multiple communication devices 101A-101N, the communication system 120, and/or with the voice/videomail system 124. For example, the voice/video module 103A may be a soft phone that can make voice and video calls to the communication devices 101B-101N via the communication system 120.

Although not shown for convenience, the communication devices 101B-101N may also have corresponding watermarking modules and voice/video modules (e.g., 102B-102N/103B-103N).

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The communication system 120 can be any hardware coupled with software that can be used to create communication sessions, such as, a Private Branch Exchange (PBX), a telecommunication system, a central office switch, a video conferencing system, a voice conferencing system, and/or the like. The communication system 120 further comprises a watermark manager 121, watermarked voice/video data 122, a mixer/recorder 123, and a voicemail/videomail system.

The watermark manager 121 can be any software that can generate watermarks, exchange watermarks, identify a watermark in a voice/video stream/file, and/or the like. The watermark manager 121 can also manage and store the watermarked voice/video data 122 (e.g., a recorded conference call, a voicemail, a videomail, and/or the like).

The mixer/recorder 123 can be any hardware coupled with software that can provide voice/video conferencing/recording for the communication devices 101A-101N. The mixer/recorder 123 may mix voice signals using both session watermarks and/or mixer watermarks. The mixer/recorder 123 may also mix video streams in a video communication session.

The voice/videomail system 124 can be or may include any hardware/software that can receive, store, and manage voice and/or videomails. For example, the voice/videomail system 124 may allow a user to call in and hear/view a voicemail and/or videomail.

Figure 2:
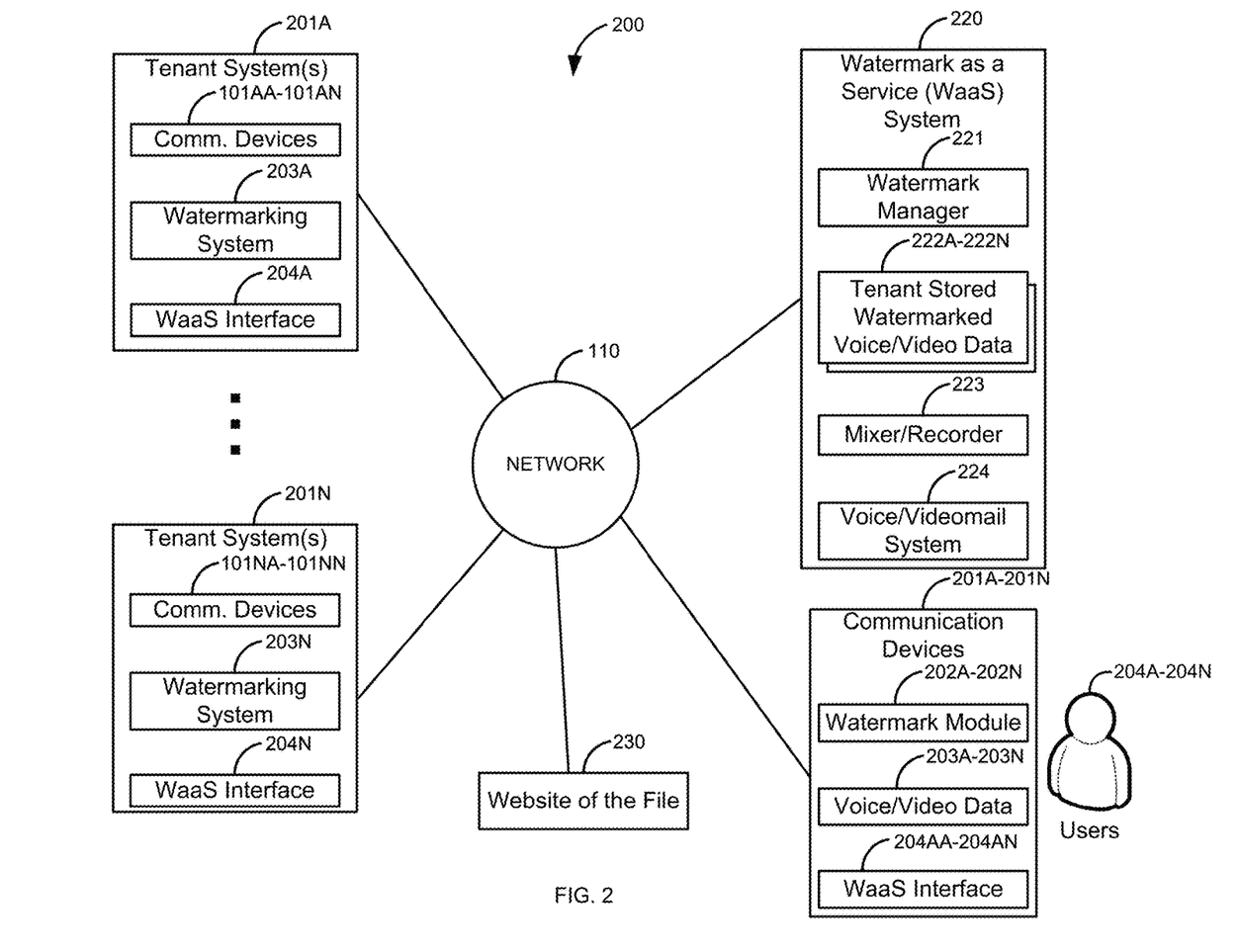
FIG. 2 is a block diagram of a second illustrative system for prevention of vishing attacks with a Watermark as a Service (WaaS).

FIG. 2 is a block diagram of a second illustrative system 200 for prevention of vishing attacks with a Watermark as a Service (WaaS). The second illustrative system 200 is where functions of the communication system 120 are incorporated into the WaaS 220. This allows the WaaS system 220 to provide watermarking for multiple tenants. A tenant may be an individual user, a corporation, an organization, a partnership, and/or the like. The second illustrative system 200 comprises tenant systems 201A-201N, the network 110, a watermark as a service system 220, communication devices 201A-201N, and a web site of a file 230. In addition, users 204A-204N are shown for convenience.

The tenant systems 201A-201N further comprise communication devices 101AA-101AN/101NA-101NN, watermarking systems 203A-203N, and WaaS interfaces 204A-204N. The communication devices 101AA-101AN/101NA-101NN are similar to the communication devices 101A-101N of FIG. 1.

The watermarking systems 203A-203N provide watermarking services similar to the watermarking module 102. The WaaS interfaces 204A-204N provides each tenant access to the WaaS system 220. For example, the WaaS interfaces 204A-204N may be a set of Application Programming Interfaces (APIs) that allow the communication devices 101AA-101AN/101NA-101NN to gain access to the WaaS system 220.

The WaaS system 220 can be any hardware coupled with software that allows the tenants the ability to gain access to watermarking services provided by the WaaS system 220. The WaaS system 220 further comprises a watermark manager 221, tenant stored watermarked voice/video data 222A-222N, mixer/recorder 223, and voice/videomail system 224.

The watermark manager 221 works similar to the watermark manager 121. The primary difference is that the watermark manager 221 provides watermark services for multiple tenants. The tenant stored watermarked voice/video data 222A-222N is similar to the watermarked voice/video data 121. The difference is that the watermarked voice/video data 222A-222N is stored on a tenant basis.

The mixer/recorder 223 is similar to the mixer/recorder 123. The difference is that the mixer/recorder 223 provides mixing/recording services for a multiple tenants. The voice/videomail system 224 is similar to the voice/videomail system 124. The difference is that the voice/videomail system 224 provides voice/videomail services for multiple tenants. In one embodiment, there may be separate instances of the mixer/recorder 223/voice/videomail system 224 for each tenant.

The communication devices 201A-201N are similar to the communication devices 101A-101N. The user communication devices 201A-201N further comprise watermark modules 202A-202N, voice/video data 203A-203N, and WaaS interfaces 204A-204N.

The watermark modules 202A-202N are similar to the watermark modules 102A-102N. The voice/video data 203A-203N is voice/video data (e.g., streamed data) that is produced by the communication devices 201A-201N. The WaaS interfaces 204A-204N are similar to the WaaS interfaces 204A-204N.

The website of the file 230 can be or may include any device that can host a file, such as, a web server, a server, a personal computer, an application server, and/or the like.

Figure 3:
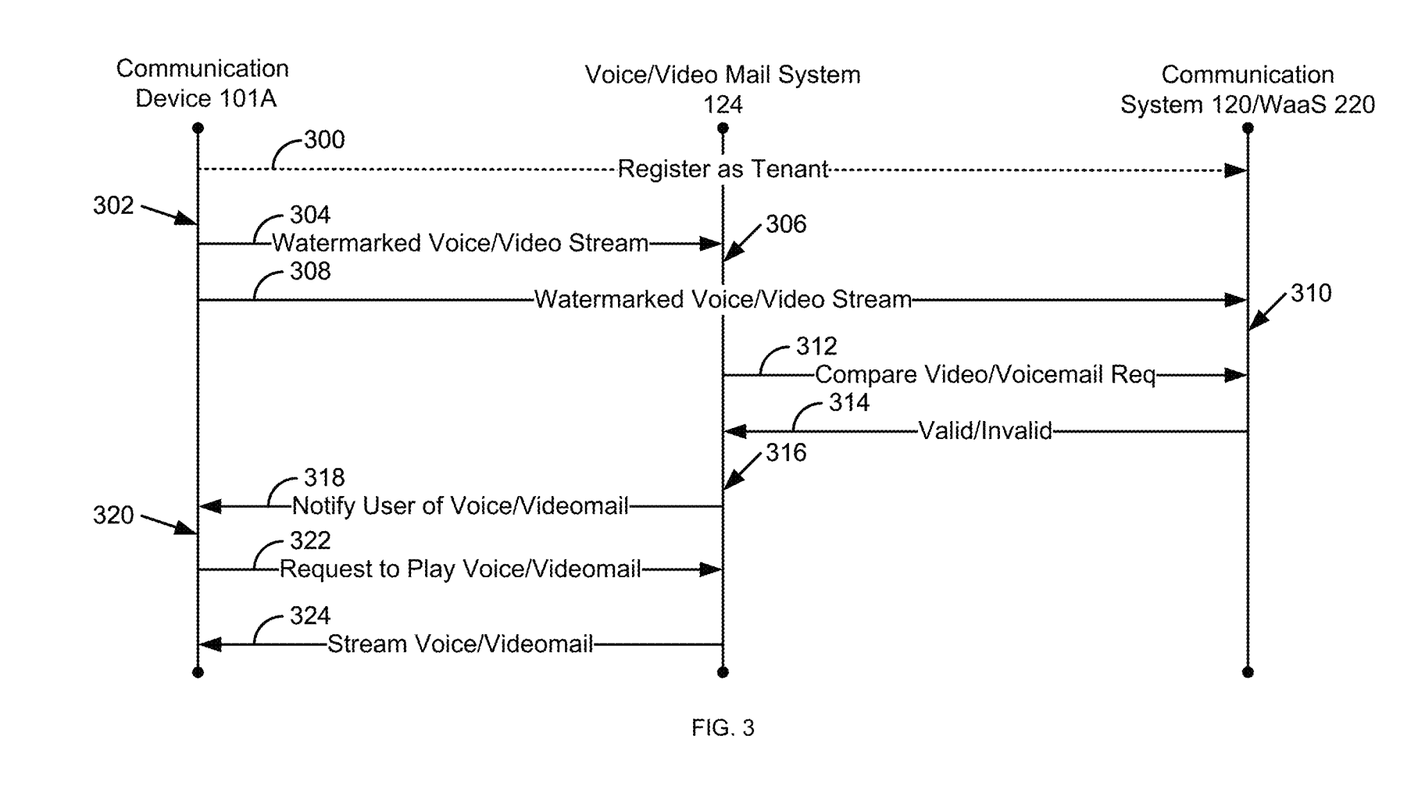
FIG. 3 is a first flow diagram of a process for prevention of a vishing attack for voicemails/videomails.

FIG. 3 is a first flow diagram of a process for prevention of a vishing attack for voicemails/videomails. Illustratively, the communication devices 101A-101N/101AA-101AN/101NA-101NN, the watermarking modules 102A-102N, the voice/video modules 103A-103N, the communication system 120, the watermark manager 121, the mixer/recorder 123, the voice/videomail system 124, the tenant systems 201A-201N, the watermark modules 202A-202N, the watermarking systems 203A-203N, the WaaS interfaces 204A-204N/204AA-204AN, the WaaS system 220, the watermark manager 221, the mixer/recorder 223, and the voice/videomail system 224 are stored-program-controlled entities, such as a computer or microprocessor, which performs the method of FIGS. 3-7 and the processes described herein by executing program instructions stored in a computer readable storage medium, such as a memory (i.e., a computer memory, a hard disk, and/or the like). Although the methods described in FIGS. 3-7 are shown in a specific order, one skill in the art would recognize that the steps in FIGS. 3-7 may be implemented in different orders and/or be implemented in a multi-threaded environment. Moreover, various steps may be omitted or added based on implementation.

The process starts in step 300 where the user 104 registers as a tenant with the WaaS system 220. Step 300 only applies to the second illustrative system 200 of FIG. 2. If the user 104 is using the embodiment of FIG. 1, step 300 will not be implemented.

The watermarking module 102 generates the session watermark in step 302. When a user 104 makes/receives a call (or based on any type of voice stream that has the user's voice), specific information may be associated with the voice/video data, such as, a device ID(s), a phone number, a Globally Unique Identifier (GUID), a random number, timing between when the user 104 speaks, a timestamp, etc. This information may then be used as an input to generate a session watermark that is embedded steganographically in the voice and/or video stream. For example, a session watermark may be generated based on the phone number, the device ID, a timestamp, a duration, etc. In one embodiment, a hashing algorithm may be used to take the information associated with the voice/video data of the stream to generate a unique number that is used to watermark the voice and/or stream. The generated session watermark may be used as an input into a watermark process that uniquely generates a session watermark within the voice and/or stream.

For example, spread spectrum audio watermarking is a technique that places a watermark into a voice stream (a watermark that is not audible). Since the watermarked voice stream is different for each voice stream, each phoneme/ word, etc. will almost always have a unique digital value when sampled. Even the same word/phoneme in same voice and/or video stream will have a unique signature. Because each phoneme/word in each voice stream is different (i.e., each has a unique representation or 'digital signature'), the system is able to detect if different phonemes/words are used to construct a vishing voicemail by looking at these representations.

In one embodiment, the session watermark may comprise multiple watermarks that are tied to specific phonemes/ words, etc. For example, a watermark may be associated with phonemes (i.e., there are 44 different phonemes in the English language), specific words, specific groups of words, sentences, acronyms, languages, and/or the like. There may be a unique session watermark generated for each phoneme for a particular language where each phoneme session watermark is unique to each phoneme for that particular voice stream. The session watermark may even be unique for the same phoneme that is in different segments of the voice stream. The session watermark may be inserted for each phoneme/word as a voice segment (analog) or digital change.

In one embodiment, the session watermark may comprise multiple session watermarks within the same voice stream. For example, the session watermark may rotate based on specific time periods/words/number of words/languages spoken, and/or the like.

Similarly, the session watermark (or a specific session video watermark) may be part of video frames to detect piecing/splicing of video frames together (or even for an individual picture of the user 104). The session watermarking of the video stream may use known techniques, such as, spatial domain watermarking. Spatial domain watermarking embeds a watermark by changing the intensity and/or color value of specific pixels in a video frame. This can include selecting the least significant bit of selected pixels using the session watermark. This provides a unique fingerprint for each video frame. This process may use other techniques. For example, instead of inserting a session watermark into every frame, the session watermark may occur every other frame. The process of generating the session watermark(s) may be used for any of the embodiments described herein.

In one embodiment, the session watermarks in the voice stream that has an associated video stream may be interrelated. Inserting a session watermark in a video frame may be triggered based on an event in the voice stream. For example, a session watermark may be placed in the video frame for every word/phoneme, after a sentence, based on a number of words/phonemes, etc. Conversely, session watermarks in the voice may be tied to the session watermarks in the video. For example, on every fifth frame, a session watermark is placed in the next voice segment, or a session watermark may be changed in the voice stream based on a gesture made in the video stream.

In another embodiment, the system can use a traditional digital signature to tie the originator, voice/video, and watermark together. In this embodiment, the system can have an authenticated header packet—i.e., phone number/date/time/ user—that is digitally signed. The watermarked stream may also be able to be signed with the same key. The header (phone number/date/time/user) record would be validated by a lookup and then used to validate the watermark. Thus, an extracted voice with a partial watermark would not be validated.

In addition, the process may distinguish between internal voice/video calls and external voice/video calls. For example, the watermark may only be used for internal voice/video calls or calls from known telephone numbers while for outside voice/video calls, the watermark process is not used. In this case, the voice/videomail may be flagged as from an outside and/or unverified source.

The watermarking module 102 watermarks/sends the voice and/or video stream using the session watermark to the voice/videomail system 124 in step 304. The voice/videomail system 124 stores the watermarked voice and/or video stream in memory in step 306. The watermarking module 102 also sends the watermarked voice and/or video stream to the watermark manager 121 in step 308. The watermark manager 121 stores the watermarked voice and/or video stream as watermarked voice/video data 122/222 in step 310.

The voice/videomail system 124 makes a request to the watermark manager 121, in step 312, to compare the two watermarked voice/video streams. When a nefarious actor tries to piece/splice different segments of voice/video stream from different sources, the watermark in the different segments of the voice/video stream were spliced together using different voice/video streams (either watermarked or not) and will be flagged as a potential vishing voice/videomail. If there are no identifiable watermarks and/or only partial watermarks in the voicemail/videomail, this can be flagged as well.

The request of step 312, may be made based on a user 104 requesting to hear/view the voice/videomail, may be based on completion of the voice/videomail, in real-time/semi-real-time, and/or the like. The watermark manager 121 responds, in step 314, and indicates whether the watermarked voice/video stream received by the voice/videomail system 124 (in step 312) matches (valid) or does not match the watermarked voice/video stream (invalid) received by the watermark manager 121 (in step 308).

The voice/videomail system 124 determines, based on the response of step 314, what to do with the voice/videomail in step 316. For example, the voice/videomail system 124 may delete the voice/videomail based on identify the voice/ videomail as a vishing email, flag the voice/videomail as a potential vishing voice/videomail, flag the voice/videomail as a legitimate voice/videomail, and/or the like.

If the voice/videomail has not been deleted (or optionally even if the voice/videomail has been deleted) in step 316, the voice/videomail system 124 notifies the user 104 of the voice/videomail in step 318. If flagged as a potential vishing voice/videomail, the indication (e.g., in a graphical user interface) may show the voice/videomail as a potential vishing voice/videomail.

The user 104 requests to hear/view the voice/videomail in step 320. A request is made to play the voice/videomail in step 322. The voice/videomail system 124 then streams the voice/videomail to the user 104 in step 324.

Figure 4:
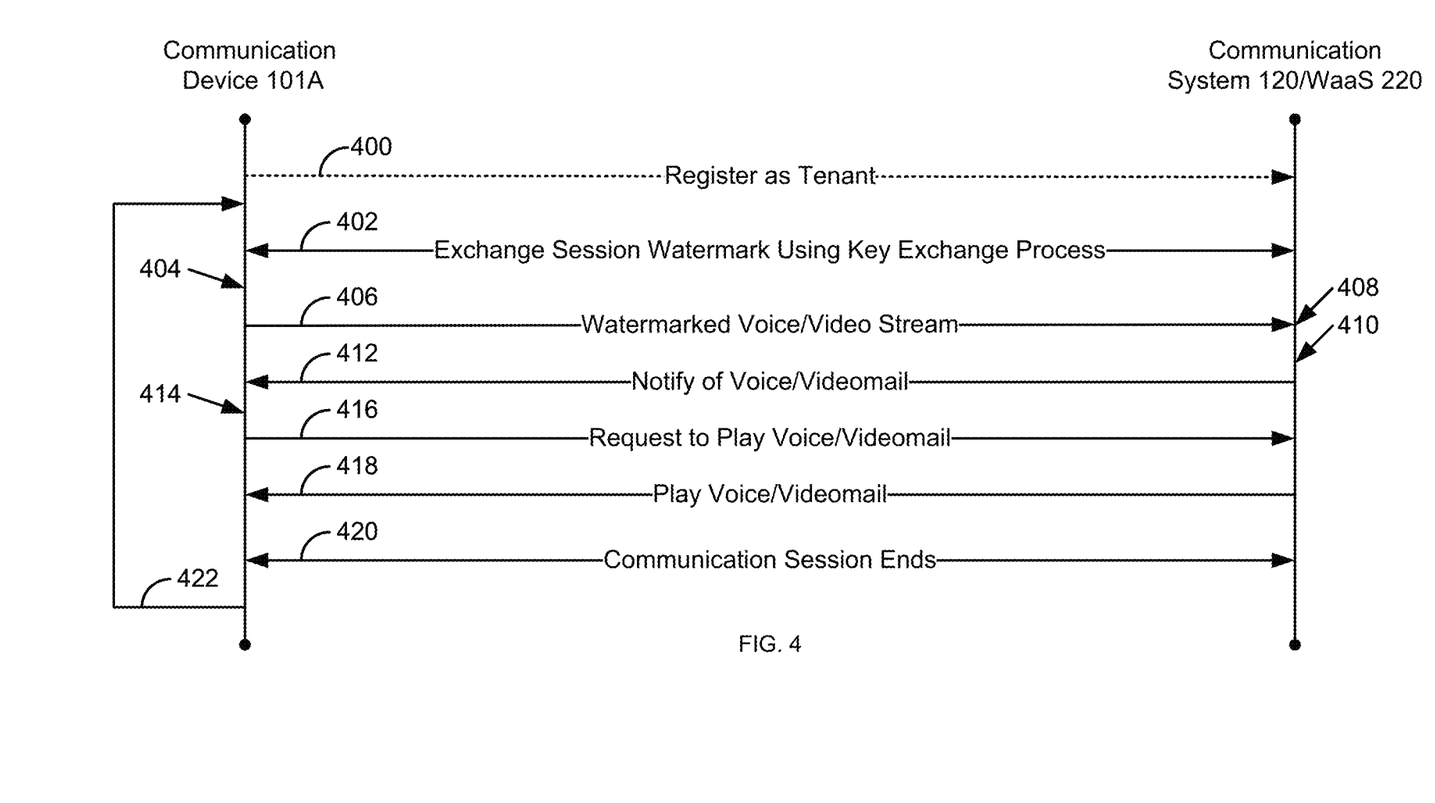
FIG. 4 is a second flow diagram of a process for prevention of a vishing attack for voicemails/videomails.

FIG. 4 is a second flow diagram of a process for prevention of a vishing attack for voicemails/videomails. The process starts in step 400 where the user 104 registers as a tenant with the WaaS system 220. Step 400 only applies to the second illustrative system 200 of FIG. 2. If the user 104 is using the embodiment of FIG. 1, step 400 will not be implemented.

The communication device 101A exchanges the session watermark using a key exchange process in step 402. For example, instead of exchanging an encryption key, the session watermark is exchanged using a key exchange process, such as, Public Key Infrastructure (PKI), Diffie-Hellman key exchange, and/or the like. Since the communication device 101A and the communication system 120/ WaaS 220 have the same session watermark, the communication system 120/WaaS 220 can verify in real-time/semi-real-time that a voice/video stream is completely generated using the session watermark. In one embodiment, multiple session watermarks may be exchanged in step 402. For example, the multiple watermarks may be used for a fixed number of communication sessions, for phonemes (for each phoneme in a language), for a language (e.g., a different watermark a particular language being used in the communication session), for words, for voice/video streams (e.g., one for the voice stream and one for the video stream), and/or the like.

The communication device generates the watermarked voice/video stream in step 404. The communication device 101A sends the watermarked voice/video stream to the voice/video mail system 124/224 in step 406. The watermark manager 121/221 verifies that the voice/video stream was completely generated using the session watermark in step 408. The voice/videomail system 124/224 stores the voice/video stream in step 410. The storage in step 410 may be based on if the voice/video stream is completely generated using the session watermark. If it is determined to be a potential vishing voice/videomail, the watermark manager 121/221 may not store the voice/videomail in step 410.

The voice/videomail system 124/224 notifies the user 104 of the voice/videomail in step 412. The notification may include information, such as, if the voice/videomail is a potential vishing attack, if the voice/videomail is valid, if the voice/videomail is from an external source and cannot be verified, and/or the like. The user 104 makes a request to play the voice/videomail in step 414. In response, the communication device 101A sends a request to play the voice/videomail in step 416. The voice/videomail system 124/224 plays the voice/videomail to the user 104 in step 418. The playing may also include information about the voice/videomail, such as, if the voice/videomail is a potential vishing attack, is from an external source, and/or the like. The communication session then ends in step 420. For example, the communication session may end when the user 104 hangs or disconnects.

The process then repeats for the next communication session, in step 422, by going back to step 402 to start a new session watermark exchange process (assuming a new session watermark is used for each communication session).

Figure 5:
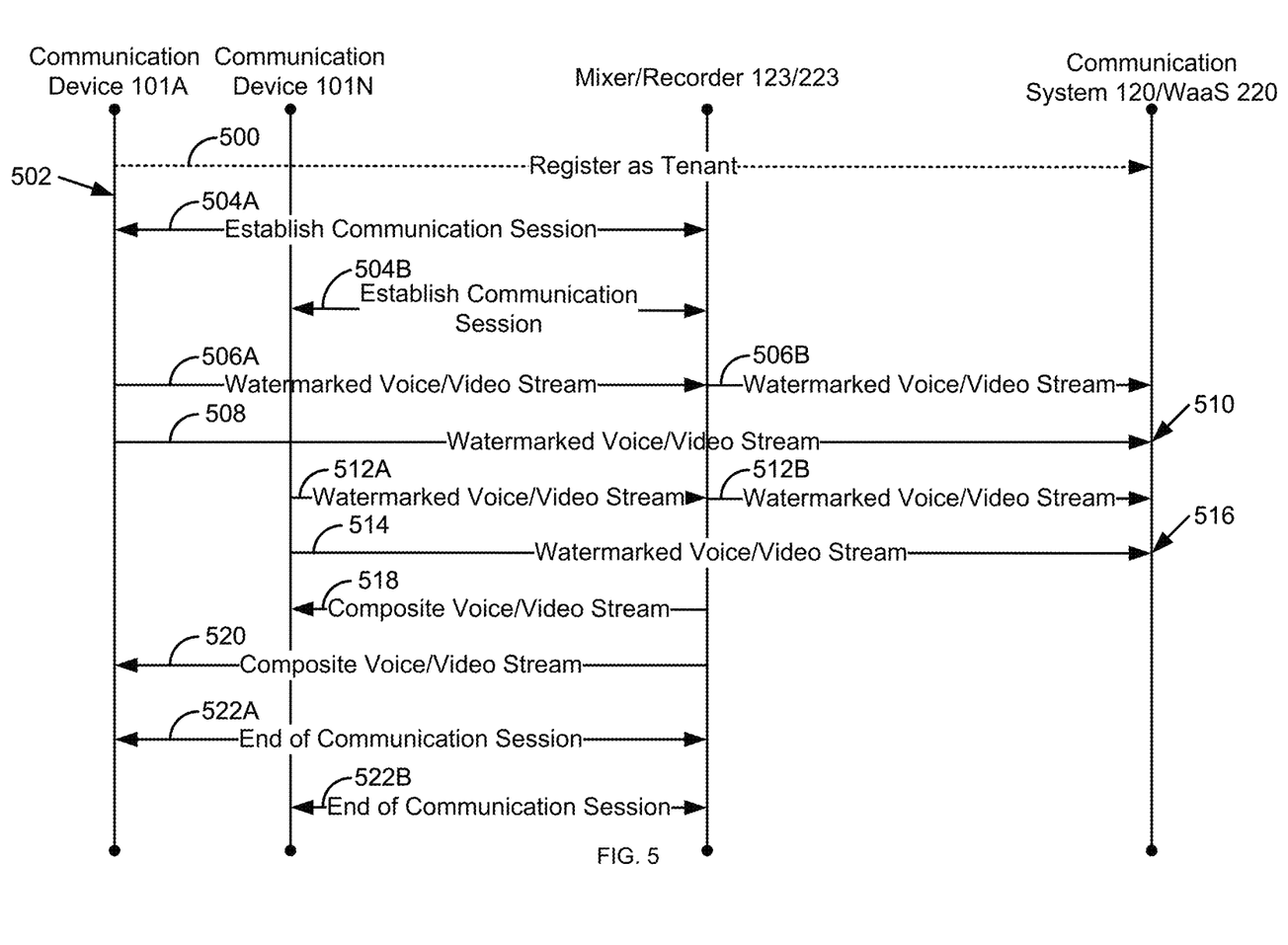
FIG. 5 is a first flow diagram of a process for prevention of a vishing attack of a conference call.

FIG. 5 is a first flow diagram of a process for prevention of a vishing attack of a conference call. The process starts in step 500 where the user 104 registers as a tenant with the WaaS system 220. Step 500 only applies to the second illustrative system 200 of FIG. 2. If the user 104 is using the embodiment of FIG. 1, step 500 will not be implemented.

The user 104A requests to initiate a communication session in step 502. The communication session may be a voice and/or video communication session. For example, the user 104A may request to initiate a voice conference call to the user 104N. A communication session is established between the mixer/recorder 123/223 and the communication devices 101A/101N in steps 504A/504B.

The communication device 101A sends a watermarked voice/video stream to the mixer recorder 123/223 in step 506A. The watermarked voice/video stream is then sent by the mixer/recorder 123/223 to the communication system 120/WaaS 220 in step 506B. The communication device 101A sends the watermarked voice/video stream to the communication system 120/WaaS 220 in step 508. The watermark manager 121/221 compares the voice/video streams of steps 506B and 508 to determine if they are the same (i.e., completely generated using the watermark) in step 510. If they are not the same, the communication session is flagged as potentially being a vishing attempt.

Likewise, the communication device 101N sends a watermarked voice/video stream to the mixer recorder 123/223 in step 512A. The watermarked voice/video stream is then sent by the mixer/recorder 123/223 to the communication system 120/WaaS 220 in step 512B. The communication device 101N sends the watermarked voice/video stream to the communication system 120/WaaS 220 in step 514. The watermark manager 121/221 compares the voice/video streams of steps 512B and 514 to determine if they are the same (i.e., completely generated using the watermark) in step 516. If they are not the same, the communication session is flagged as potentially being a vishing attempt.

The mixer/recorder 123/223 generates a composite voice/video stream that is sent to the communication devices 101A/101N in step 518/520. The composite voice/video stream is the voice/video data that is from the other communication device(s) 101 in the communication session. For example, if there are three communication devices 101A, 101B, and 101N in a voice communication session, the composite stream to the communication device 101A will comprise the voice streams from the communication devices 101B and 101N.

Figure 6:
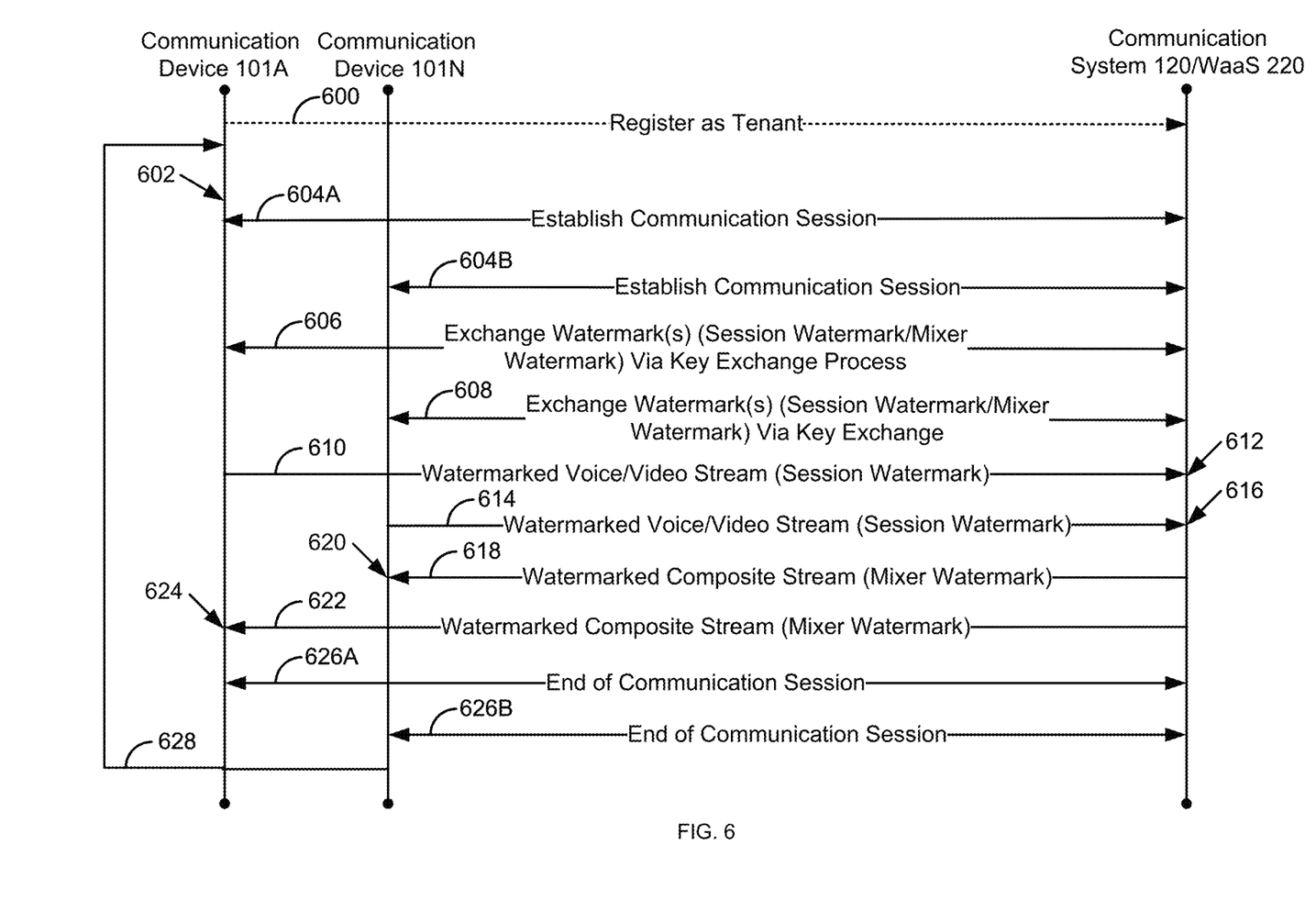
FIG. 6 is a second flow diagram of a process for prevention of a vishing attack of a conference call.

FIG. 6 is a second flow diagram of a process for prevention of a vishing attack of a conference call. The process starts in step 600 where the user 104 registers as a tenant with the WaaS system 220. Step 600 only applies to the second illustrative system 200 of FIG. 2. If the user 104 is using the embodiment of FIG. 1, step 600 will not be implemented.

The user 104A requests to initiate a communication session in step 602. The communication session may be a voice and/or video communication session. For example, the user 104A may request to initiate a video conference call to the user 104N. A communication session is established between the mixer/recorder 123/223 (in the communication system 120/WaaS 220) and the communication devices 101A/101N in steps 604A/604B.

The communication device 101A exchanges the session watermark(s) and the mixer watermark, in step 606, using a key exchange process (e.g., using Diffie-Hellman/PKI). Likewise, the communication device 101N exchanges the session watermark(s) and the mixer watermark in step 608. In this case, there is a session watermark for each communication device that is typically different. On the other hand, there is typically only a single mixer watermark (but could be one for each communication device 101 in the communication session).

The communication device 101A sends, in step 610, a watermarked voice/video stream based on the session watermark received in step 606. The watermark manager 121/221 in the communication system 120/WaaS 220 verifies, in step 612, that the voice/video stream of step 610 is completely generated using the session watermark received in step 606 (i.e., in real-time/semi-real-time).

Likewise, the communication device 101N sends, in step 614, a watermarked voice/video stream based on the session watermark received in step 608. The watermark manager 121/221, in the communication system 120/WaaS 220, verifies, in step 616, that the voice/video stream of step 614 is completely generated using the session watermark received in step 608 (i.e., in real-time/semi-real-time). If in steps 612/616 it is determined that the voice/video streams are not completely generated using the watermark (or only a portion of voice/video stream), the individual stream may be dropped or the users 104 may be notified of a potential security breach/vishing attack.

The mixer/recorder 123/223 sends, in step 618, a watermarked composite video/video stream to the communication device 101N (e.g., the voice/video stream of step 610) based on the mixer watermark. The watermarking module 102A determines, in step 620, if the composite stream has been watermarked with the mixer watermark. If it is determined that the composite stream of step 618 is not watermarked (or partially watermarked) with the mixer watermark, the watermarking module 102A may flag the composite stream of step 618 as being compromised (e.g., a vishing attack).

Likewise, the mixer/recorder 123/223 sends, in step 622, a watermarked composite video/video stream to the communication device 101A (e.g., the watermarked voice/video stream of step 614) based on the mixer watermark. The watermarking module 102A determines, in step 624, if the composite stream of step 622 has been watermarked with the mixer watermark. If it is determined that the composite stream of step 622 is not watermarked with the mixer watermark (or partially watermarked), the watermarking module 102N may flag the composite stream of step 622 as being compromised (e.g., a vishing attack).

The communication then ends in steps 626A/626B. For example, the user 104A may hang up or disconnect. The process then repeats for the next communication session in step 628 by going back to step 602 to start a new communication session/watermark exchange process (assuming a new session watermark is used for each communication session).

Figure 7:
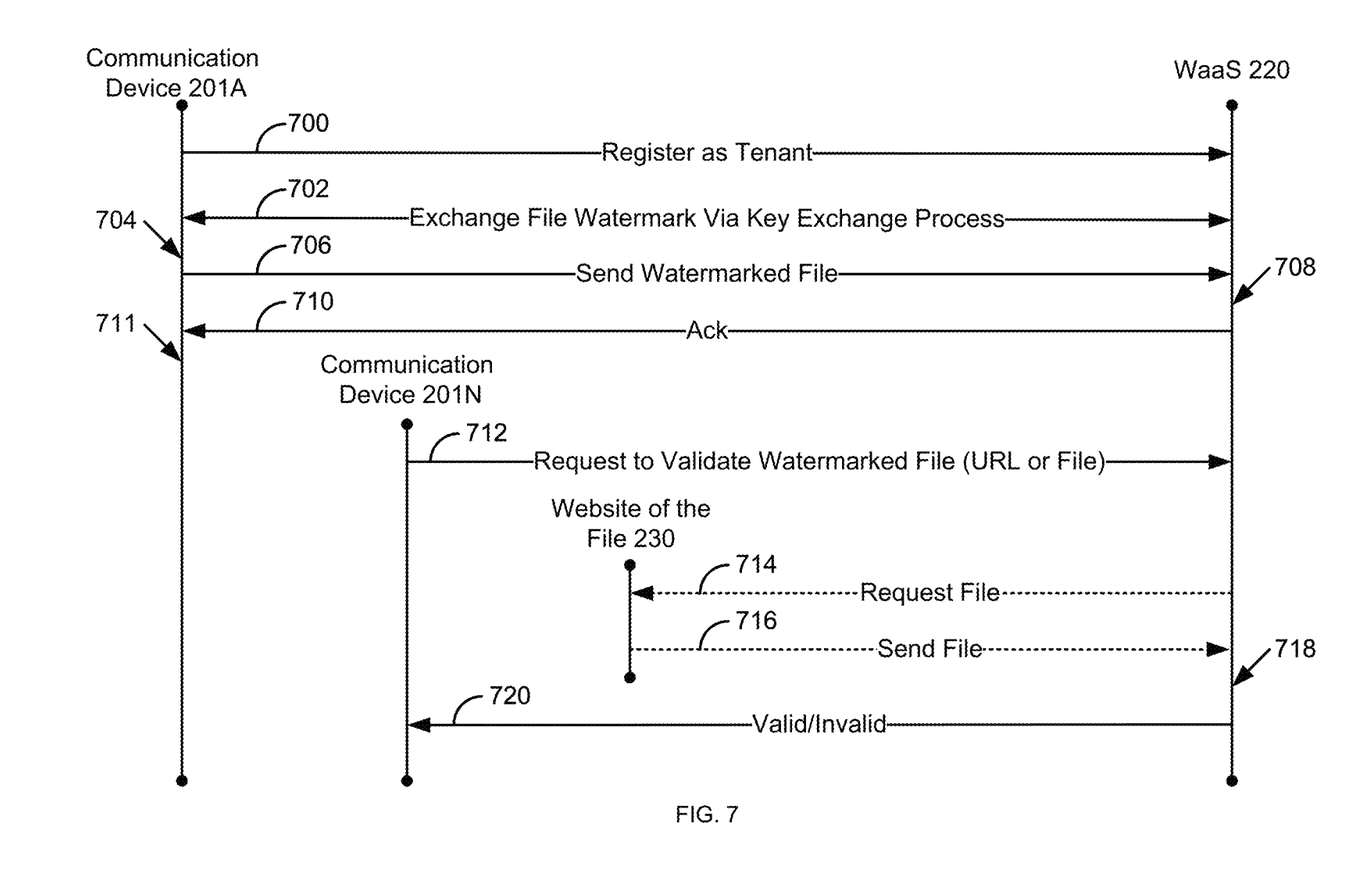
FIG. 7 is a flow diagram of a process for validating a video/video file by exchanging a file watermark using a key exchange process.

FIG. 7 is a flow diagram of a process for validating a voice/video file by exchanging a file watermark using a key exchange process. The process starts in step 700 where the user 104 registers as a tenant with the WaaS system 220. Although not shown, the process of FIG. 7 may also work with the system of FIG. 1.

The communication device 201A exchanges a file watermark using a key exchange process in step 702. The communication device 201A watermarks the file using the exchanged file watermark in step 704. For example, the communication device 201A watermarks a video recording of a user 104 that is to be posted on a blog site 230. The communication device 201A sends, in step 706, the watermarked file to the WaaS system 220. The WaaS system 220 stores the watermarked file in step 708. The WaaS system 220 acks the sending of the watermarked file in step 710. The user 201A then posts the file to website of the file 230 in step 711.

At a later point in time, the user 204N wants to determine if the watermarked file is valid. The communication device 201N sends, in step 712, a request to validate the file. The request can include the file or a Universal Resource Locator (URL). If the request includes a URL, the WaaS system 220 makes a request, in step 714, to download the file from the website of the file 230. The website of the file 230 sends the file in step 716. The WaaS system 220 compares, in step 718, the file to the watermarked file stored in step 708. If the file from step 706 or 716 matches (has been recorded with the file watermark) the WaaS responds that the file is valid in step 720. Otherwise, if the two files watermark do not match in step 718, the WaaS responds in step 720 that the file is invalid.

For all of the embodiments described herein, a threshold of a watermark may be used to determine if a stream/file has been properly watermarked with the same watermark. For example, if more than 99% of the file has created using the watermark, the file may be considered valid. When discussing determining that a stream/file is a completely generated using a watermark herein and in the claims, this may be based on a threshold. If there is a difference, the portions(s) that are different may be identified. For example, if the word "no" in a communication session is not watermarked or has a different watermark, the system can identify the specific portions of the communication session that are not watermarked or have a different watermark.

The watermarks/other information may be stored as part of a database or as part of a blockchain. For example, each voice/video stream with the session watermark(s) may be stored in a blockchain. The system can then generate the specific phonemes/words that have been watermarked with a specific session watermark from the stored voice/video stream. Alternatively, specific session watermarks associated with phonemes/words may be stored as individual blocks in the blockchain. The blockchain can then be searched for individual phonemes/word session watermarks to verify if a voicemail/videomail have been spliced together. Using a blockchain allows for enhanced protection of the session watermarks/mixer watermarks/file watermarks/other information by providing redundancy in the storage of the voice/video data 122/222. In addition, the other information may also be stored in the blockchain (e.g., the device ID, the random number, the input number to the watermark algorithm, etc.).

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:
receive a first communication stream, wherein the first communication stream is part of a first communication session;
determine if the first communication stream is completely generated using a first session watermark;
in response to determining that the first communication stream is completely generated using the first session watermark, identifying the first communication stream as a legitimate communication stream; and
in response to determining that the first communication stream has not been completely generated using the first session watermark identifying the first communication stream as a vishing communication stream and/or a potential vishing communication stream,
wherein determining if the first communication stream is completely generated using the first session watermark is accomplished by comparing the first communication stream to a second communication stream that was completely generated with the first session watermark,
wherein the second communication stream is a copy of the first communication stream, and
wherein the first communication stream and the second communication stream are both sent by a same communication device.

2. The system of claim 1, wherein the first session watermark is exchanged using a key exchange process.

3. The system of claim 2, wherein the determining that the first communication stream is completely generated using the first session watermark is done in real-time or semi-real-time.

4. The system of claim 2, wherein the first communication stream comprises a plurality of watermarked communication streams where each of the plurality of watermarked communication streams are generated based on separate session watermarks exchanged by the key exchange process, and wherein the plurality of communication streams comprise a conference communication session.

5. The system of claim 4, wherein the conference communication session comprises a plurality of composite video and/or voice streams that are watermarked based on a mixer watermark.

6. The system of claim 1, wherein the first communication stream comprises a plurality of watermarked communication streams where each of the plurality of watermarked communication streams are completely generated based on separate session watermarks, and wherein the plurality of communication streams comprise a conference communication session.

7. The system of claim 1, wherein the first communication stream is sent to a voicemail and/or a videomail system.

8. The system of claim 1, wherein the first session watermark is a voice session watermark and wherein the voice session watermark comprises a plurality of voice session watermarks that are applied to at least one of: a phoneme level, a word level, a language level, a sentence level, and a time period level.

9. The system of claim 1, wherein the first session watermark is a video session watermark and wherein the video session watermark is applied based on specific number of video frames.

10. The system of claim 1, wherein the first session watermark is generated using a hashing algorithm that uses at least one of: a device identifier, a phone number, a Globally Unique Identifier (GUID), timing between when a user speaks, and a timestamp as an input.

11. The system of claim 1, wherein the first session watermark comprises a voice session watermark and a video session watermark and wherein the voice session watermark and the video session watermark are interrelated.

12. The system of claim 1, wherein the microprocessor readable and executable instructions further cause the microprocessor to:
determine if the first communication stream is from an internal network and/or from a registered device;
in response to determining that the first communication stream is from the internal network and/or from the registered device, determining if the first communication stream is completely generated using the first session watermark; and
in response to determining if the first communication stream is not from the internal network or from the registered device, not determining if the first communication stream is completely generated using a first session watermark.

13. The system of claim 1, wherein the first session watermark is changed to a second session watermark for the second communication stream in a second communication session.

14. The system of claim 1, wherein the first session watermark comprises a plurality of watermarks and wherein the plurality of session watermarks are stored in a blockchain as separate blocks.

15. A method, comprising:
receiving, by a microprocessor, a first communication stream, wherein the first communication stream is part of a first communication session;
determining, by the microprocessor, if the first communication stream is completely generated using a first session watermark;
in response to determining that the first communication stream is completely generated using the first session watermark, identifying, by the microprocessor, the first communication stream as a legitimate communication stream; and
in response to determining that the first communication stream has not been completely generated using the first session watermark identifying, by the microprocessor, the first communication stream as a vishing communication steam and/or a potential vishing communication stream,
wherein determining if the first communication stream is completely generated using the first session watermark is accomplished by comparing the first communication stream to a second communication stream that was completely generated with the first session watermark,
wherein the second communication stream is a copy of the first communication stream, and wherein the first communication stream and the second communication stream are both sent by a same communication device.

16. The method of claim 15, wherein the first session watermark is exchanged using a key exchange process.

17. The method of claim 16, wherein the first communication stream comprises a plurality of watermarked communication streams where each of the plurality of watermarked communication streams are generated based on separate session watermarks exchanged by the key exchange process, wherein the plurality of communication streams comprise a conference communication session, and wherein the conference communication session comprises a plurality of composite video and/or voice streams that are watermarked based on a mixer watermark.

18. A system, comprising:
a microprocessor; and
a computer readable medium, coupled with the microprocessor and comprising microprocessor readable and executable instructions that, when executed by the microprocessor, cause the microprocessor to:
receive a first communication stream, wherein the first communication stream is part of a first communication session;
determine if the first communication stream is completely generated using a first session watermark;
in response to determining that the first communication stream is completely generated using the first session watermark, identifying the first communication stream as a legitimate communication stream;
in response to determining that the first communication stream has not been completely generated using the first session watermark identifying the first communication stream as a vishing communication stream and/or a potential vishing communication stream,
determine if the first communication stream is from an internal network and/or from a registered device;
in response to determining that the first communication stream is from the internal network and/or from the registered device, determining if the first communication stream is completely generated using the first session watermark; and
in response to determining if the first communication stream is not from the internal network or from the registered device, not determining if the first communication stream is completely generated using a first session watermark.

19. The system of claim 18, wherein the first session watermark is exchanged using a key exchange process.

20. The system of claim 19, wherein the determining that the first communication stream is completely generated using the first session watermark is done in real-time or semi-real-time.

* * * * *